Nov. 21, 1950 M. BECKER 2,531,101
LAWN SPRINKLER SYSTEM
Filed June 29, 1948
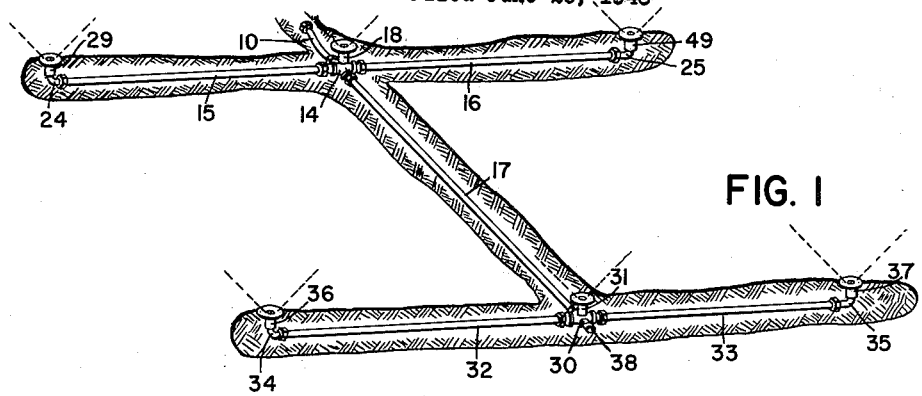
FIG. 1
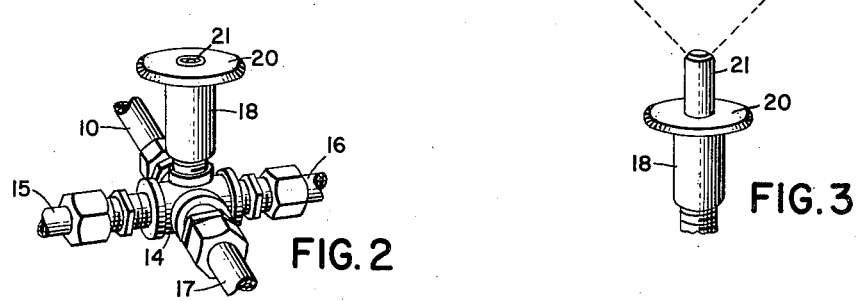
FIG. 2 FIG. 3
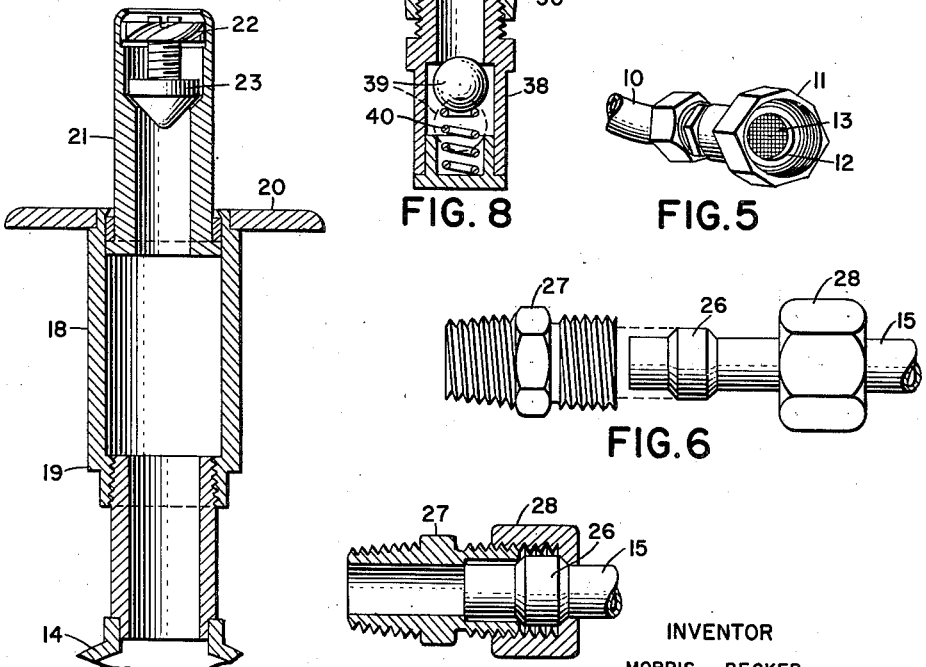
FIG. 4 FIG. 8 FIG. 5
FIG. 6
FIG. 7
INVENTOR
MORRIS BECKER
BY McKnight and Comstock
ATTORNEYS Patented Nov. 21, 1950

2,531,101

UNITED STATES PATENT OFFICE 2,531,101

LAWN SPRINKLER SYSTEM

Morris Becker, Chicago, Ill., assignor to Federal Auto Products Co., Chicago, Ill., a corporation of Illinois Application June 29, 1948, Serial No. 35,874

1 Claim. (Cl. 299—61)

My invention relates to a lawn sprinkler system of small size which may be easily installed by the user in the lawn of a home or elsewhere.

Heretofore lawn sprinkler systems have been expensive and difficult to install, requiring the services of skilled plumbers and the installation of special pumping equipment so that the cost is far beyond the reach of the average home owner. It is among the objects of my invention to provide a home-owner lawn sprinkler system for homes, which may be installed by the home owner himself with no tools other than a wrench, with the system operating from the normal home water pressure without special pumping equipment, resulting in a lawn sprinkler system which is within the budget of any home owner.

It is among the further objects of my invention to provide such a sprinkler system which is constructed entirely of non-ferrous materials, so that the parts beneath the ground will not rust; to construct such a system in which each of the parts is easily replaceable; to provide a drain for the system which operates automatically without the turning of any valves and to provide a sprinkler system which is automatic in operation and which does not interfere with the use and enjoyment of the lawn, or the mowing of grass growing thereon.

The entire installation of my lawn sprinkler system is simple and economical. It is within the skill and the budget of virtually every home owner. In addition to homes, it may be used in the grounds of apartments, parks, institutions, school grounds, tennis courts, athletic fields, gardens, nurseries, truck farms and any other place where an automatic sprinkler system is desirable.

All of the component parts of my sprinkler system are made of non-ferrous metals, so that there is no problem of rust or corrosion. The system operates automatically on the house water pressure, without the installation of expensive pumps. If more than one installation is made in a yard, the systems may be operated alternately to cover the entire yard with water.

The sprinkler heads used with my system are level with the ground, so that there is no interference with the normal use of the lawn for parties or games, and the lawn may be cut in the normal manner. When the water is turned on, the sprinkler heads rise above the surface of the ground and submerge when the water is turned off.

My invention also comprises such other objects, advantages and capabilities as will later more fully appear, and which are inherently possessed by my invention.

While I have shown in the accompanying drawing a preferred embodiment of my invention, yet it is understood that the same is susceptible of modification and change without departing from the spirit of my invention.

Referring to the drawings, Fig. 1 is a diagrammatic view of my automatic underground sprinkler system installed in a lawn; Fig. 2 is a detailed perspective view of my junction fitting and attached parts; Fig. 3 is a detailed perspective view of my sprinkler head in operation; Fig. 4 is an enlarged sectional view of my sprinkler head; Fig. 5 is a perspective view of my hose coupler; Fig. 6 is an elevational view of my sleeve and fitting construction for connecting copper tubing; Fig. 7 is a detailed sectional view of my sleeve and fitting construction in connected position and Fig. 8 is a detailed sectional view of my drain valve.

A preferred embodiment of my invention comprises a water intake tube 10, which is preferably made of copper tubing. Water intake tube 10 is curved in a modified S shape so that in use one end projects above the surface of the ground, while the other end is buried approximately three inches beneath the surface. The end above the ground is provided with a hose coupler 11, which is screw threaded to receive the end of a garden hose. Within hose coupler 11 adjacent the screw threads are a rubber washer 12 and an intake filter 13, which is composed of fine mesh bronze screen. In operation, the end of the home garden hose is attached to hose coupler 11 and intake filter 13 prevents impurities from entering the sprinkler system.

The other end of water intake tube 10 is screw threaded for attachment to a junction fitting 14, which is a five way brass junction fitting. When my lawn sprinkler system has been installed, junction fitting 14 is positioned approximately three inches beneath the surface of the ground. Junction fitting 14 is provided with four side outlets at right angles to each other. Water intake tube 10 is attached to one of these outlets. Three copper water distribution tubes 15, 16 and 17 are attached by screw threading to the other side outlets of junction fitting 14. Distribution tubes 15, 16 and 17 are preferably composed of copper tubing in lengths of approximately nine feet.

The fifth outlet of junction fitting 14 is perpendicular to the side outlets. Attached by screw threads to this outlet is a brass sprinkler head 18. Sprinkler head 18 is provided with a cylindrical base 19, which is screw threaded on the inside of its lower end. At the opposite end of sprinkler head 18 is a circular support 20, which has a larger diameter than cylindrical base 19. The length of cylindrical base 19 is such that circular support 20 rests just above the surface of the ground and serves to prevent sprinkler head 18 from sinking beneath the surface. The edges of circular support 20 are beveled so as to prevent interference with the mowing of the lawn.

Housed within cylindrical base 19 of sprinkler head 18 is a sleeve 21, which is open at its lower end and has at its opposite end an atomizer 22. Sleeve 21 is normally housed within cylindrical base 19. When water enters my sprinkler system, the water pressure against the top of sleeve 21 forces sleeve 21 to move upwardly until its top projects more than an inch above the ground. Atomizer 22 then causes the water to be sprayed in a circle radially from the top of sleeve 21.

Atomizer 22 of sprinkler head 18 provides four jets of water which strike against each other and break the water into a mist. In the center of atomizer 22 is a spray control 23, adapted to be operated by a screw driver to control the fineness of the spray emerging from atomizer 22.

Water distributiton tubes 15 and 16 lead from opposite sides of junction fitting 14 to points approximately nine feet away from junction fitting 14. At the ends of distribution tubes 15 and 16 are attached elbow terminals 24 and 25.

The copper tubing used in my device is attached to the fittings through the use of a sleeve 26, which is positioned near the end of the copper tubing. Sleeve 26 fits against the fitting 27. A nut 28 screw threaded on the inside is slid over the sleeve and screw threaded on to fitting 27, one side of the nut bearing firmly against sleeve 26 to hold the copper tubing in place.

Attached by screw threading to the upright portions of elbow terminals 24 and 25 in my sprinkler system are sprinkler heads 29 and 49, which are identical in construction and operation with sprinkler head 18, which has been previously described.

Distribution tube 17, which is attached to junction fitting 14 on the opposite side from water intake tube 10, leads to a point approximately nine feet away from junction fitting 14. The end of distribution tube 17 is attached by screw threading to one side of a five way drain fitting 30, which is similar in construction to junction fitting 14.

The upright outlet of drain fitting 30 is provided with a sprinkler head 31, which is identical with sprinkler head 18. Attached to the side outlets of drain fitting 30 by screw threading are the ends of distribution tubes 32 and 33 which lead to points approximately nine feet away from drain fitting 30. Attached to each of the opposite ends of distribution tubes 32 and 33 by screw threading are elbow terminals 34 and 35, which are identical with elbow terminals 24 and 25. Attached to elbow terminals 34 and 35 by screw threading are sprinkler heads 36 and 37, which are identical with sprinkler head 18.

Attached by screw threading to the side outlet of drain fitting 30 opposite distribution tube 17 is an automatic drain valve 38, with an open end. Housed within drain valve 38 are a brass ball 39 and a bronze spring 40. Spring 40 normally holds ball 39 away from the open end of drain valve 38. When water passes through my sprinkler system, the force of the water pressure causes ball 39 to move outwardly to seal the open end of drain valve 38. When the water is turned off and the pressure is reduced, spring 40 forces ball 39 away from the open end of drain valve 38. Water may then flow around ball 39 and out of the open end of drain valve 38. Air to replace the water enters through sprinkler heads 18, 29, 49, 31, 36 and 37.

The preferable method of installing my sprinkler system is to first assemble all of the component parts described above. The copper tubing of the water distribution tubes may, if desired, be bent or curved to accommodate the layout of the lawn. All of the fittings used in my system are solderless compression fittings which become sealed with the use of only a wrench. No other tools are necessary, and no skill is necessary beyond that possessed by the average home owner. The services of a skilled plumber are not required.

After the assembly of the parts has been completed, the ground should be marked in the places where the parts will be buried. The sprinkler assembly may then be set to one side and a narrow trench dug approximately three and one-half inches deep along the lines marked. The turf may be saved for replacement after the system has been installed.

The bottom of the trench should be filled with sand or gravel to provide a firm base. The sprinkler system may then be set down in the trench and the ground replaced. The turf may be set over the trench, where it will again take root. Additional sand or gravel should be provided adjacent the automatic drain valve to provide for the disposal of the drain water and prevent clogging of the drain valve.

Having thus described my invention, I claim:

A sub-surface automatic lawn sprinkler system composed entirely of non-rusting parts, installable by a home owner without the use of plumber's tools other than a wrench, comprising a water intake tube, a five-way junction fitting having an inlet attached to one end of said water intake tube, said junction fitting having a front outlet directly opposite said inlet, a pair of said outlets at right angles to said inlet and front outlet, and a top outlet, a pair of water distribution tubes attached at one end to said side outlets, water sprayers attached to said top outlet and to the opposite ends of said water distribution tubes, a third water distribution tube attached to said front outlet, a four-way junction fitting attached to the opposite end of said third water distribution tube directly opposite the five-way junction fitting, said four-way junction fitting having a second pair of side outlets transverse to said third water distribution tube and a vertical outlet, a second pair of water distributiton tubes attached to said second pair of side outlets, said second pair of water distribution tubes extending parallel to the first pair of said water distribution tubes, water sprayers attached to the opposite ends of each of said second pair of water distribution tubes and to the vertical outlet of said four-way junction fitting, all of said water sprayers having a housing containing therein a movable sleeve, said sleeves having atomizers at their upper ends, said water intake tube adapted to be attached at its other end to the normal water pressure supply of the home, to receive water therefrom and to pass the same on to said junctions, said outlets, said tubes, said sprayers, said sleeves and said atomizers for operation of the sprinkler system, said water causing said sleeves to move upwardly upon and while receiving pressure from water flowing into said sprayers and against the upper ends of said sleeves, said atomizers causing water flowing through said sleeves to be sprayed outwardly in radial sprays from the upper ends of all of said sprayers to sprinkle the lawn.

MORRIS BECKER.

REFERENCES CITED

The following references are of record in the file of this patent:

UNITED STATES PATENTS

| Number | Name | Date |
|---|---|---|
| 212,719 | Mansfield | Feb. 25, 1879 |
| 337,236 | Briscoe | Mar. 2, 1886 |
| 1,192,743 | Brooks | July 25, 1916 |
| 1,207,705 | Bonnell | Dec. 12, 1916 |
| 1,589,252 | Sherman | June 15, 1926 |

FOREIGN PATENTS

| Number | Country | Date |
|---|---|---|
| 26,234 | Great Britain | of 1907 |